US012559091B2

(12) United States Patent
    Kobayashi et al.

(10) Patent No.:  US 12,559,091 B2
(45) Date of Patent:      Feb. 24, 2026

(54) CONTROL DEVICE FOR CONTROLLING SAFETY DEVICE IN VEHICLE

(71) Applicants:DENSO CORPORATION, Kariya (JP); TOYOTA JIDOSHA KABUSHIKI KAISHA, Toyota (JP)

(72) Inventors: Atsushi Kobayashi, Kariya (JP); Yoshiki Hayakawa, Kariya (JP); Masumi Fukuman, Kariya (JP); Akihiro Kida, Toyota (JP); Kunihiro Sugihara, Nagakute (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 245 days.

(21) Appl. No.: 17/658,224

(22) Filed: Apr. 6, 2022

(65) Prior Publication Data

US 2022/0227362 A1      Jul. 21, 2022

Related U.S. Application Data

(63) Continuation of application No. PCT/JP2020/038048, filed on Oct. 7, 2020.

(30) Foreign Application Priority Data

Oct. 11, 2019    (JP) ................................. 2019-187641

(51) Int. Cl.
B60W 30/09          (2012.01)
B60R 21/01          (2006.01)
                (Continued)
(52) U.S. Cl.
CPC ............. B60W 30/09 (2013.01); B60R 21/01 (2013.01); B60W 10/18 (2013.01);
                (Continued)

(58) Field of Classification Search
CPC .. B60W 30/09; B60W 10/18; B60W 30/0956; B60W 50/14; B60W 2554/20;
                (Continued)

(56) References Cited

U.S. PATENT DOCUMENTS 9,481,365 B2 * 11/2016  Tokoro .............. B60W 30/0956
10,007,854 B2 * 6/2018  Blayvas ................. H04N 13/20
                (Continued)

FOREIGN PATENT DOCUMENTS

JP      2004-230947 A     8/2004
JP      2015-078926 A     4/2015
                (Continued)

OTHER PUBLICATIONS

Translation of JP-2017015494-A (Year: 2017).*

*Primary Examiner* — Ramya P Burgess
*Assistant Examiner* — Preston Jay Miller
(74) *Attorney, Agent, or Firm* — Maschoff Brennan

(57) ABSTRACT

A control device to be applied to a vehicle equipped with an imaging device, a ranging device, and a safety device is configured to, based on moving-object detection information around the vehicle acquired from images captured by the imaging device, perform a first actuation process directed to moving objects to actuate the safety device, and based on stationary-object detection information around the vehicle acquired from measurements made by the ranging device, perform a second actuation process directed to stationary objects to actuate the safety device. In the control device, a mask region setting unit is configured to set at least either neighborhood-of-stationary-object regions or far-side regions as a mask region. An actuation restriction unit is configured to, in response to the moving object determined (Continued)

to be present around the vehicle being present in the mask area, restrict performance of the first actuation process on the moving object.

4 Claims, 6 Drawing Sheets

(51) Int. Cl.

| | |
|---|---|
| *B60W 10/18* | (2012.01) |
| *B60W 30/095* | (2012.01) |
| *B60W 50/14* | (2020.01) |
| *G01S 15/36* | (2006.01) |
| *G01S 15/58* | (2006.01) |
| *G01S 15/931* | (2020.01) |
| *G06V 20/58* | (2022.01) |

(52) U.S. Cl.

CPC ........ *B60W 30/0956* (2013.01); *B60W 50/14* (2013.01); *G01S 15/36* (2013.01); *G01S 15/586* (2013.01); *G01S 15/931* (2013.01); *G06V 20/58* (2022.01); *B60R 2021/01272* (2013.01); *B60W 2050/143* (2013.01); *B60W 2050/146* (2013.01); *B60W 2420/403* (2013.01); *B60W 2420/54* (2013.01); *B60W 2554/20* (2020.02); *B60W 2554/40* (2020.02); *B60W 2554/80* (2020.02)

(58) Field of Classification Search

CPC ......... B60W 2554/80; B60W 2554/40; B60W 2050/143; B60W 2050/146; B60W 2420/403; B60W 2420/54; B60W 2420/408; B60W 40/04; B60W 30/08; G06V 20/58; B60R 21/01; B60R 2021/01272; B60R 21/0134; G01S 15/36; G01S 15/586; G01S 15/931; G01S 15/876; G01S 15/58; G01S 15/86; G08G 1/16

USPC .......................................................... 701/301

See application file for complete search history.

(56) References Cited

U.S. PATENT DOCUMENTS

| | | | |
|---|---|---|---|
| 2006/0190175 A1 | 8/2006 | Moriizumi et al. | |
| 2009/0187290 A1 | 7/2009 | Moriizumi et al. | |
| 2011/0015818 A1* | 1/2011 | Breuer ................ | B60W 30/085 |
| | | | 701/31.4 |
| 2015/0109164 A1 | 4/2015 | Takaki | |
| 2015/0217765 A1 | 8/2015 | Tokoro | |
| 2016/0116441 A1 | 4/2016 | Fukuman et al. | |
| 2017/0217394 A1* | 8/2017 | Shima ..................... | G08G 1/16 |
| 2017/0299720 A1 | 10/2017 | Matsuura et al. | |
| 2017/0371338 A1* | 12/2017 | Kamata .................. | G05D 1/024 |
| 2018/0151073 A1* | 5/2018 | Minemura ............ | G08G 1/166 |
| 2018/0154889 A1* | 6/2018 | Minemura ............ | G08G 1/163 |
| 2018/0357772 A1* | 12/2018 | Takemura .............. | G06V 20/58 |
| 2018/0366001 A1* | 12/2018 | Matsunaga ........... | B60W 50/14 |
| 2018/0370531 A1* | 12/2018 | Matsunaga ............ | B60R 21/00 |
| 2019/0156684 A1* | 5/2019 | Pohl ........................ | G08G 5/55 |
| 2019/0205695 A1* | 7/2019 | Yan ....................... | G06V 10/757 |
| 2019/0232956 A1* | 8/2019 | Takaki .................. | G01S 13/931 |
| 2020/0023837 A1* | 1/2020 | Yokoi .............. | B60W 30/0956 |
| 2020/0247403 A1* | 8/2020 | Beuth .................... | G01S 13/86 |
| 2020/0402256 A1* | 12/2020 | Kobayashi ........... | G05D 1/0251 |
| 2020/0410750 A1* | 12/2020 | Huang ................... | G01S 17/89 |
| 2021/0073559 A1* | 3/2021 | Pyo ....................... | B60W 40/02 |
| 2021/0268998 A1* | 9/2021 | Brickwedde .......... | G08G 1/166 |

FOREIGN PATENT DOCUMENTS

| | | | | |
|---|---|---|---|---|
| JP | 2015-148899 A | | 8/2015 | |
| JP | 2016-080648 A | | 5/2016 | |
| JP | 2016-085042 A | | 5/2016 | |
| JP | 2017-15494 A | | 1/2017 | |
| JP | 2017015494 A | * | 1/2017 | |
| JP | 2018-151903 A | | 9/2018 | |
| JP | 2019-86406 A | | 6/2019 | |
| WO | 2004/068165 A1 | | 8/2004 | |
| WO | WO-2019064062 A1 | * | 4/2019 | ............... B60S 1/02 |

* cited by examiner

FIG.2

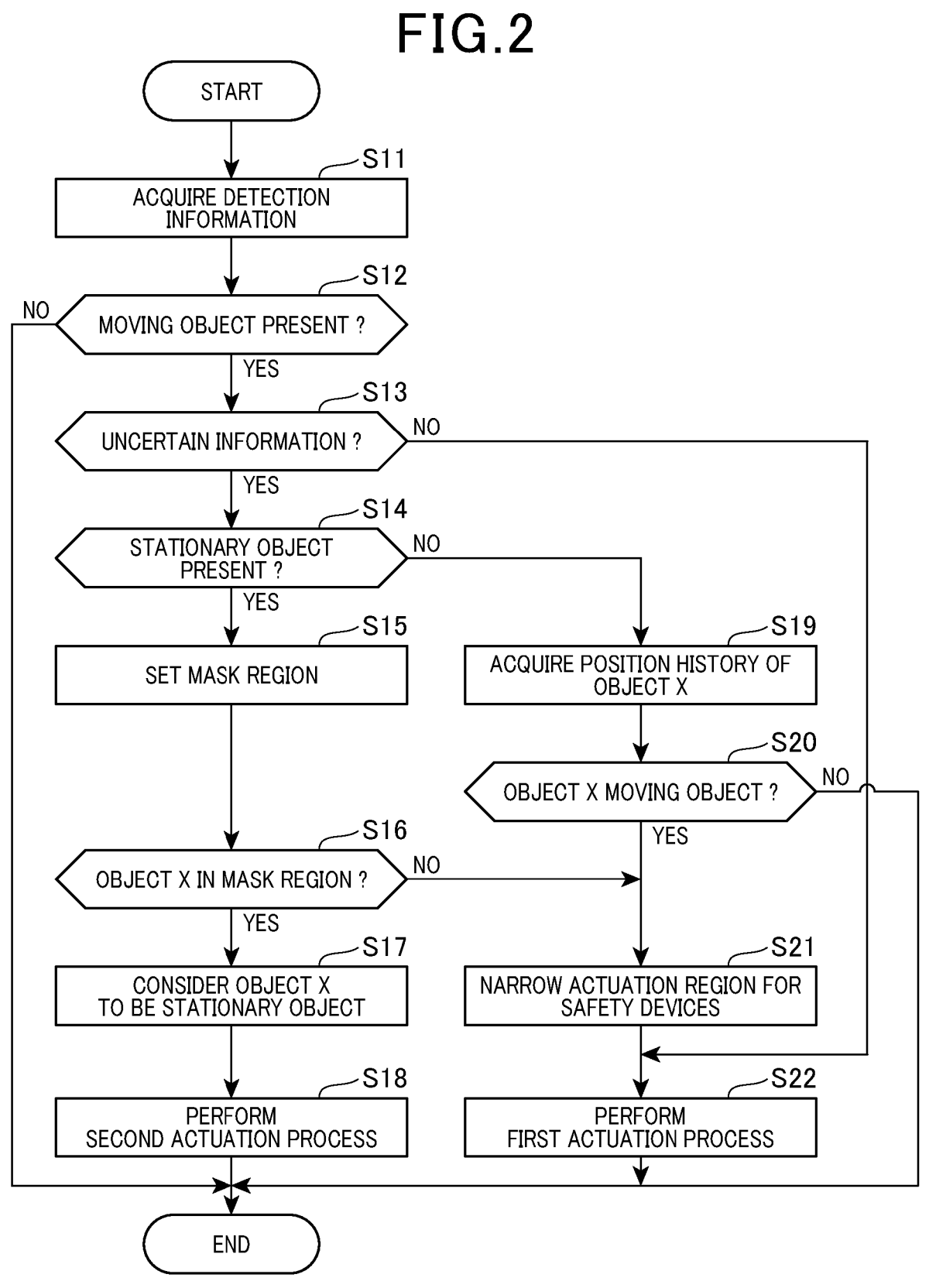

```
                        START

│
                          ▼                    ⌐S11
              ┌─────────────────────────┐
              │   ACQUIRE DETECTION      │
              │       INFORMATION        │
              └─────────────────────────┘
                          │
                          ▼                    ⌐S12
   NO      ╱─────────────────────────────╲
◄──────────┤    MOVING OBJECT PRESENT ?   │
           ╲─────────────────────────────╱
                          │ YES
                          ▼                    ⌐S13
           ╱─────────────────────────────╲   NO
           ┤     UNCERTAIN INFORMATION ?  ├─────────────────────┐
           ╲─────────────────────────────╱                      │
                          │ YES                                  │
                          ▼                    ⌐S14              │
           ╱─────────────────────────────╲   NO                 │
           ┤      STATIONARY OBJECT       ├──────────┐           │
           │          PRESENT ?           │          │           │
           ╲─────────────────────────────╱          │           │
                          │ YES                      │           │
                          ▼              ⌐S15        ▼    ⌐S19   │
              ┌──────────────────────┐   ┌────────────────────────┐
              │    SET MASK REGION    │   │ ACQUIRE POSITION HISTORY│
              └──────────────────────┘   │      OF OBJECT X        │
                          │              └────────────────────────┘
                          │                          │
                          │                          ▼        ⌐S20
                          │              ╱─────────────────────────╲  NO
                          │              ┤  OBJECT X MOVING OBJECT ?├──┐
                          │              ╲─────────────────────────╱  │
                          ▼        ⌐S16                 │ YES          │
           ╱─────────────────────────────╲  NO          │              │
           ┤   OBJECT X IN MASK REGION ?  ├─────────────►│              │
           ╲─────────────────────────────╱              │              │
                          │ YES                          │              │
                          ▼          ⌐S17                ▼      ⌐S21    │
              ┌──────────────────────┐   ┌────────────────────────┐    │
              │   CONSIDER OBJECT X   │   │ NARROW ACTUATION REGION │    │
              │  TO BE STATIONARY     │   │    FOR SAFETY DEVICES   │    │
              │       OBJECT          │   └────────────────────────┘    │
              └──────────────────────┘              │                   │
                          │          ⌐S18           ◄──────────────────┘
                          ▼                          ▼      ⌐S22
              ┌──────────────────────┐   ┌────────────────────────┐
              │       PERFORM         │   │        PERFORM          │
              │ SECOND ACTUATION      │   │  FIRST ACTUATION        │
              │      PROCESS          │   │      PROCESS            │
              └──────────────────────┘   └────────────────────────┘
                          │                          │
                          ▼◄─────────────────────────┘

END
```

CONTROL DEVICE FOR CONTROLLING SAFETY DEVICE IN VEHICLE

CROSS-REFERENCE TO RELATED APPLICATION

This application is a continuation application of International Application No. PCT/JP2020/038048 filed Oct. 7, 2020 which designated the U.S. and claims priority to Japanese Patent Application No. 2019-187641 filed with the Japan Patent Office on Oct. 11, 2019, the contents of each of which are incorporated herein by reference.

BACKGROUND

Technical Field

The present disclosure relates to a control device for controlling a safety device in a vehicle.

Related Art

Conventionally, a device is known that detects an object around an own vehicle and predicts a collision between the detected object and the own vehicle. This device detects objects around the own vehicle based on ultrasonic waves transmitted and received by a radar sensor mounted to the front end of the own vehicle.

BRIEF DESCRIPTION OF THE DRAWINGS

In the accompanying drawings:

FIG. 2 is a flowchart of a collision avoidance process;

FIG. 3A is an illustration of an example of stationary-object neighborhood regions;

FIG. 3B is an illustration of an example of far-side regions;

DESCRIPTION OF SPECIFIC EMBODIMENTS

Figure 1A:
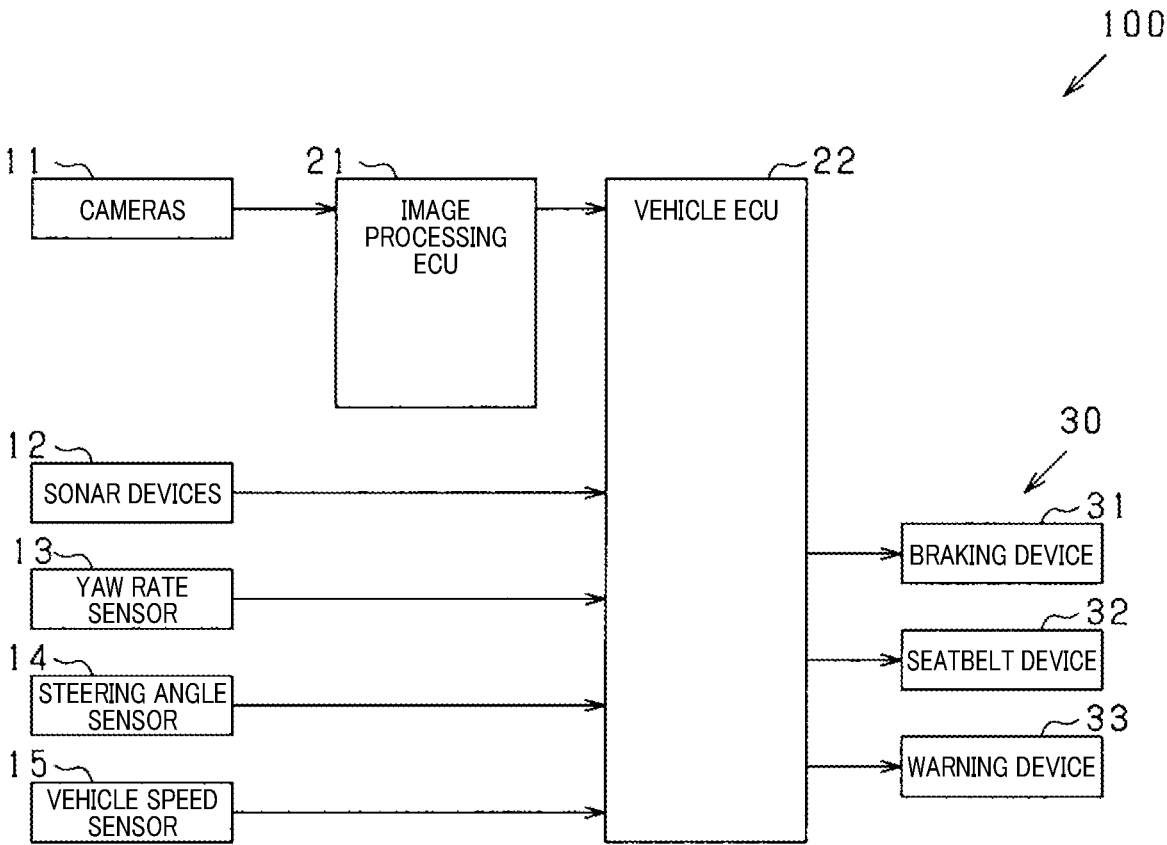
FIG. 1A is an illustration of an overall configuration of a driving assistance apparatus.

For the above known device, as disclosed in, for example, Japanese Laid-Open Patent Publication No. 2004-230947, it is also possible to detect objects around the own vehicle based on images captured by an imaging device mounted to the own vehicle, in addition to the radar sensor. In the vehicle equipped with the radar sensor and the imaging device, moving objects around the own vehicle may be detected based on the images captured by the imaging device, and stationary objects around the own vehicle may be detected based on measurements made by the radar sensor. However, in some positional relationships between a moving object and a stationary object, it is not possible to properly detect the moving object, which thus makes it impossible to correctly actuate safety devices, such as a braking device and the like, for the moving object.

For example, when there is another object near a wall as a stationary object, and the stationary object (i.e., the wall) and the other object are present in the same captured image, whether the other object is a moving object or a stationary object may be mistakenly detected. In addition, when a moving object is present on the far side of a wall as a stationary object, the moving object may be detected as a moving object for which the own vehicle is to be controlled despite the own vehicle not having to be controlled for the moving object on the far side of the wall.

In view of the foregoing, it is desired to have a control device capable of making a proper determination of a moving object and correctly actuating a safety device.

One aspect of the present disclosure provides a control device to be applied to a vehicle equipped with an imaging device that captures images of surroundings of the vehicle, a ranging device that measures a distance to an object around the vehicle, and a safety device that avoids a collision between the vehicle and the object or reduces collision damages. The control device is configured to, based on moving-object detection information around the vehicle acquired from the images captured by the imaging device, perform a first actuation process directed to moving objects to actuate the safety device, and based on stationary-object detection information around the vehicle acquired from measurements made by the ranging device, perform a second actuation process directed to stationary objects to actuate the safety device. The control device includes; a moving-object determination unit configured to, based on the moving-object detection information, determine whether a moving object is present around the vehicle, a stationary-object determination unit configured to, based on the stationary-object detection information, determine whether a stationary object is present around the vehicle, a mask region setting unit configured to set at least either neighborhood-of-stationary-object regions that are regions including the stationary object determined to be present around the vehicle by the stationary-object determination unit and its surroundings, or far-side regions that are regions on a far side of the stationary object with respect to the vehicle, as a mask region; and an actuation restriction unit configured to, in response to the moving object determined to be present around the vehicle by the moving-object determination unit being present in the mask area, restrict performance of the first actuation process on the moving object.

In the vehicle (own vehicle) equipped with the ranging device and the imaging device, moving objects around the own vehicle may be detected based on the images captured by the imaging device, and stationary objects around the own vehicle may be detected based on measurements from the ranging device. However, in some positional relationships between a moving object and a stationary object, it is not possible to properly detect the moving object, which thus makes it impossible to correctly perform the first actuation process directed to the moving object.

In this regard, at least either neighborhood-of-stationary-object regions A1 that are regions including a stationary object determined based on stationary-object detection information and its surroundings, or far-side regions A2 that are regions on the far side of the stationary object with respect to the own vehicle, are set as a mask region. In response to a moving object determined based on moving-object detection information being present in the mask region, performance of the first actuation process directed to the moving object is restricted. With this configuration, even if another stationary object present around the wall as a stationary object is mistakenly determined to be a moving object, the inconvenience of the safety device being unnecessarily actuated during the first actuation process due to a false determination that the other stationary object is a moving object can be suppressed. Even in cases where a moving object is present on the far side of the wall as a stationary object, the inconvenience of the safety device being unnecessarily actuated during the first actuation process can be suppressed. This can lead to a proper determination of a moving object and therefore allows the safety device to be correctly actuated based on this determination.

Embodiments

An embodiment in which a control device according to the present disclosure is applied to a driving assistance apparatus 100 mounted to an own vehicle will now be described with reference to the accompanying drawings.

As illustrated in FIG. 1A, the driving assistance apparatus 100 of the present embodiment includes cameras 11, sonar devices 12, an image processing electronic control unit (ECU) 21, a vehicle ECU 22, and safety devices 30.

Each camera 11 is, for example, a monocular camera. The cameras 11 are respectively attached to the front end, the rear end, and left and right sides of the own vehicle, and capture images of surroundings of the own vehicle. Each camera 11 transmits image information of the captured images to the image processing ECU 21. In the present embodiment, the camera 11 corresponds to an "imaging device."

Each sonar device 12 is, for example, an ultrasonic sensor that uses ultrasonic waves as transmission waves, or a radar device that uses high-frequency signals in the millimeter wave band as transmission waves. The sonar devices 12 are respectively mounted to the front end, the rear end, and left and right sides of the own vehicle, and measure a distance to each object around the own vehicle. Specifically, each sonar device 12 transmits a probe wave every predefined cycle and receives its reflected waves using a plurality of antennas. A distance to each object is measured by detecting a plurality of detection points on the object based on the time of transmission of the probe wave and times of reception of its reflected waves. In addition, an azimuth of the object is calculated based on a phase difference of the reflected waves received by the plurality of antennas. Upon the distance and the azimuth of the object being successfully calculated, the position of the object relative to the own vehicle can be determined.

Each sonar device 12 calculates a movement speed of each object based on a change in frequency of the reflected wave reflected by the object due to the Doppler effect. This allows whether the object around the own vehicle is a stationary object to be detected. Specifically, an object is detected as a stationary object when the sum of the movement speed of the object and the travel speed of the own vehicle is zero. Each sonar device 12 transmits stationary-object detection information directed to stationary objects around the own vehicle to the vehicle ECU 22. The stationary-object detection information includes information about the position of each detected stationary object relative to the own vehicle. In the present embodiment, each sonar device 12 corresponds to a "ranging device."

Each of the ECUs 21 and 22 is a control unit that includes a well-known microcomputer formed of a central processing unit (CPU), a read-only memory (ROM), a random-access memory (RAM), a flash memory, and other components. The ECUs 21 and 22 acquire various signals and perform various control based on the acquired information.

Specifically, the image processing ECU 21 detects moving objects around the own vehicle based on the images captured by the cameras 11. Specifically, the image processing ECU 21 calculates a movement speed of each object in the captured images from the cameras 11. The image processing ECU 21 calculates an optical flow of each object based on the image information transmitted from the cameras 11 every predefined cycle and calculates the movement speed of the object based on the calculated optical flow. The optical flow is a motion vector representing movement of a plurality of boundary points that are detected as points forming a boundary line across which the luminance changes in the captured image. The moving objects present around the own vehicle are thereby detected. The image processing ECU 21 transmits moving-object detection information directed to moving objects around the own vehicle to the vehicle ECU 22. The moving-object detection information includes information about the position of each detected moving object relative to the own vehicle.

The vehicle ECU 22 actuates the safety devices 30 based on the moving-object detection information directed to moving objects around the own vehicle transmitted from the image processing ECU 21. The safety devices 30 are configured to avoid a collision between the own vehicle and each object or reduce collision damages, and include a braking device 31, a seat belt device 3, and a warning device 33. In the present embodiment, the vehicle ECU 22 corresponds to a "control device."

Figure 1B:
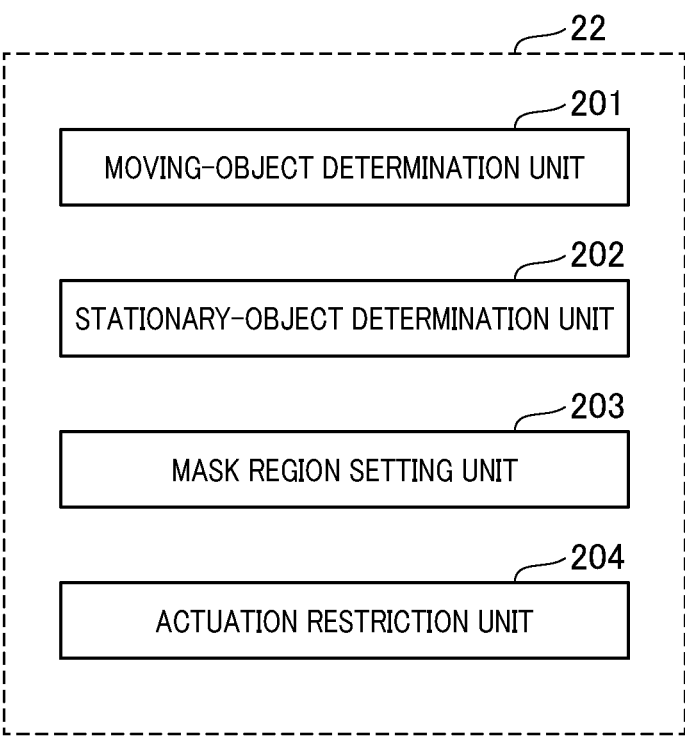
FIG. 1B is a functional block of a vehicle ECU of the driving assistance apparatus.

FIG. 1B illustrates a functional block diagram of the vehicle ECU 22. The vehicle ECU 22 includes, as functional blocks, a moving-object determination unit 201, a stationary-object determination unit 202, a mask region setting unit 203, and an actuation restriction unit 204. Functions of these functional blocks 201-204 are implemented by the CPU executing a program stored in the ROM.

The braking device 31 decelerates the own vehicle based on a collision avoidance signal output from the vehicle ECU 22. Based on the collision avoidance signal output from the vehicle ECU 22, the seatbelt device 32 winds up the seatbelt to tighten the seatbelt. The warning device 33 is configured to notify the driver or the like of a collision being likely to occur based on the collision avoidance signal output from the vehicle ECU 22. The warning device 33 may include an auditory warning device, such as a speaker or a buzzer, or a visual warning device, such as a display, which are installed in the cabin of the own vehicle.

The vehicle ECU 22 is connected to a yaw rate sensor 13, a steering angle sensor 14, and a vehicle speed sensor 15. The yaw rate sensor 13 is installed, for example, at the center of the own vehicle, and outputs a yaw rate signal corresponding to a rate of change in amount of steering of the own vehicle to the vehicle ECU 22. The steering angle sensor 14 is attached to, for example, the steering column of the own vehicle, and outputs a steering angle signal corresponding to a change in steering angle of the steering wheel caused by the driver's operation. The steering angle sensor 14 outputs the steering angle signal to the vehicle ECU 22. The speed sensor 15 is attached to, for example, a wheel of the own vehicle and detects a direction of rotation of the wheel and outputs a vehicle speed signal corresponding to a wheel speed to the vehicle ECU 22.

In the own vehicle of the present embodiment, moving objects around the own vehicle are detected based on the images captured by the cameras 11, and stationary objects around the own vehicle are detected based on measurements made by the sonar devices 12. The vehicle ECU 22 actuates the safety devices 30 in collision avoidance processes, that is, a first actuation process to be performed on moving objects and a second actuation process to be performed on stationary objects. In the first actuation process, the vehicle ECU 22 actuates the safety devices 30 to avoid a collision with each moving object or mitigate damages upon impact with the moving object, taking into account not only the position of the moving object relative to the own vehicle, but also a movement path and a movement speed of the moving object. In the second actuation process, the vehicle ECU 22 actuates the safety devices 30 to avoid a collision with each stationary object or mitigate damages upon impact with the stationary object, based on a distance from the own vehicle to the stationary object.

In a configuration where moving objects are detected using images captured by the cameras 11, it is not possible to properly detect a moving object in some positional relationships between the moving object and a stationary object, which thus makes it impossible to correctly perform the first actuation process to be performed on moving objects. For example, in cases where there is another object near a wall as a stationary object, and the stationary object (i.e., the wall) and the other object are present in the same captured image, whether the other object is a moving object or a stationary object may be mistakenly detected. In other cases where a moving object is present on the far side of a wall as a stationary object, the moving object may be detected as a moving object for which the own vehicle is to be controlled despite the own vehicle not having to be controlled for the moving object on the far side of the wall.

In the present embodiment, a determination as to whether there is a moving object around the own vehicle is made based on the moving-object detection information, and a determination as to whether there is a stationary object around the own vehicle is made based on the stationary-object detection information. In addition, at least either neighborhood-of-stationary-object regions A1 that are regions including the stationary object and its surroundings, or far-side regions A2 that are regions on the far side of the stationary object with respect to the own vehicle are set as a mask region. In response to the there being a moving object in the mask region, performance of the first actuation process on the moving object is restricted.

In a configuration where moving objects are detected using images captured by the cameras 11, a determination as to whether there is a moving object around the own vehicle may not be correctly made despite the presence of the same object having been detected, except in cases where the same object around the own vehicle has been already determined to be a moving object. For each object around the own vehicle, the image processing ECU 21 determines certain information (or reliable information) indicating that it is certain that the object around the own vehicle is a moving object or uncertain information (or unreliable information) indicating that it is not certain whether the object is a moving object, and transmits the certain information or the uncertain information to the vehicle ECU 22. Such certain information and uncertain information is information indicating the presence of a moving object, where the certain information is high probability information indicating with a high probability that a moving object is present, and the uncertain information is low probability information indicating with a low probability that a moving object is present than the high probability information. If the safety devices 30 are actuated regardless of whether the object around the own vehicle is detected with certain information or uncertain information, there is a concern that the safety devices 30 may not be properly actuated.

In the present embodiment, when actuating the safety devices 30, an actuation region where the safety devices 30 are actuated is changed according to whether the moving-object detection information is certain information or uncertain information. When the moving-object detection information is uncertain information, the actuation region is narrowed as compared to when the moving-object detection information is certain information.

FIG. 2 illustrates a flowchart of a collision avoidance process performed based on moving objects located around the own vehicle. This process is repeatedly performed by the vehicle ECU 22 every predefined cycle.

In FIG. 2, at step S11, the vehicle ECU 22 acquires moving-object detection information and stationary-object detection information. Specifically, the vehicle ECU 22 acquires, as the moving-object detection information, information about positions and paths of travel of moving objects, such as other vehicles, bicycles, and pedestrians, around the own vehicle, from the image processing ECU 21. In addition, the vehicle ECU 22 acquires position information of stationary objects detected by the sonar devices 12.

At step S12, the vehicle ECU 22 determines whether the moving-object detection information includes information indicating the presence a moving object. More specifically, the vehicle ECU 22 determines whether the moving-object detection information transmitted from the image processing ECU 21 is any of certain information and uncertain information. If the moving-object detection information is any of certain information and uncertain information, the vehicle ECU 22 determines that a moving object is present. If the answer is NO at step S12, the vehicle ECU 22 terminates the collision avoidance process. If the answer is YES at step S12, the vehicle ECU 22 proceeds to step S13. At step S13, the vehicle ECU 22 determines whether the moving-object detection information is uncertain information among certain information and uncertain information. In the present embodiment, the process step S12 corresponds to the moving-object determination unit 201 in FIG. 1B.

If the moving-object detection information is certain information and the answer at step S13 is therefore NO, then the vehicle ECU 22 proceeds to step S22. At step S22, the vehicle ECU 22 performs the collision avoidance process (the first actuation process) directed to moving objects. In this case, since an object detected around the own vehicle is recognized as a moving object, the vehicle ECU 22 performs collision avoidance control to actuate the safety devices 30 based on the position and the like of the moving object included in the moving-object detection information.

If the moving-object detection information is uncertain information and the answer at step S13 is therefore YES, then the vehicle ECU 22 proceeds to step S14, where the vehicle ECU 22 determines whether a stationary object is present around the own vehicle. The presence or absence of a stationary object is determined using the stationary-object detection information acquired based on measurements made by the sonar devices 12. Specifically, the vehicle ECU 22 determines whether the stationary-object detection information includes information that indicates the presence of a stationary object. In the present embodiment, the process step S14 corresponds to the stationary-object determination unit 202 in FIG. 1B.

If a stationary object is present around the own vehicle and the answer at step S14 is therefore YES, then the vehicle ECU 22 proceeds to step S15. At step S15, the vehicle ECU 22 sets neighborhood-of-stationary-object regions A1 that include the stationary object and its surroundings and far-side regions A2 that are regions on the far side of the stationary object with respect to the own vehicle, as a mask region. In the present embodiment, the process step S15 corresponds to the mask region setting unit 203 in FIG. 1B.

Figures 3A, 3B:
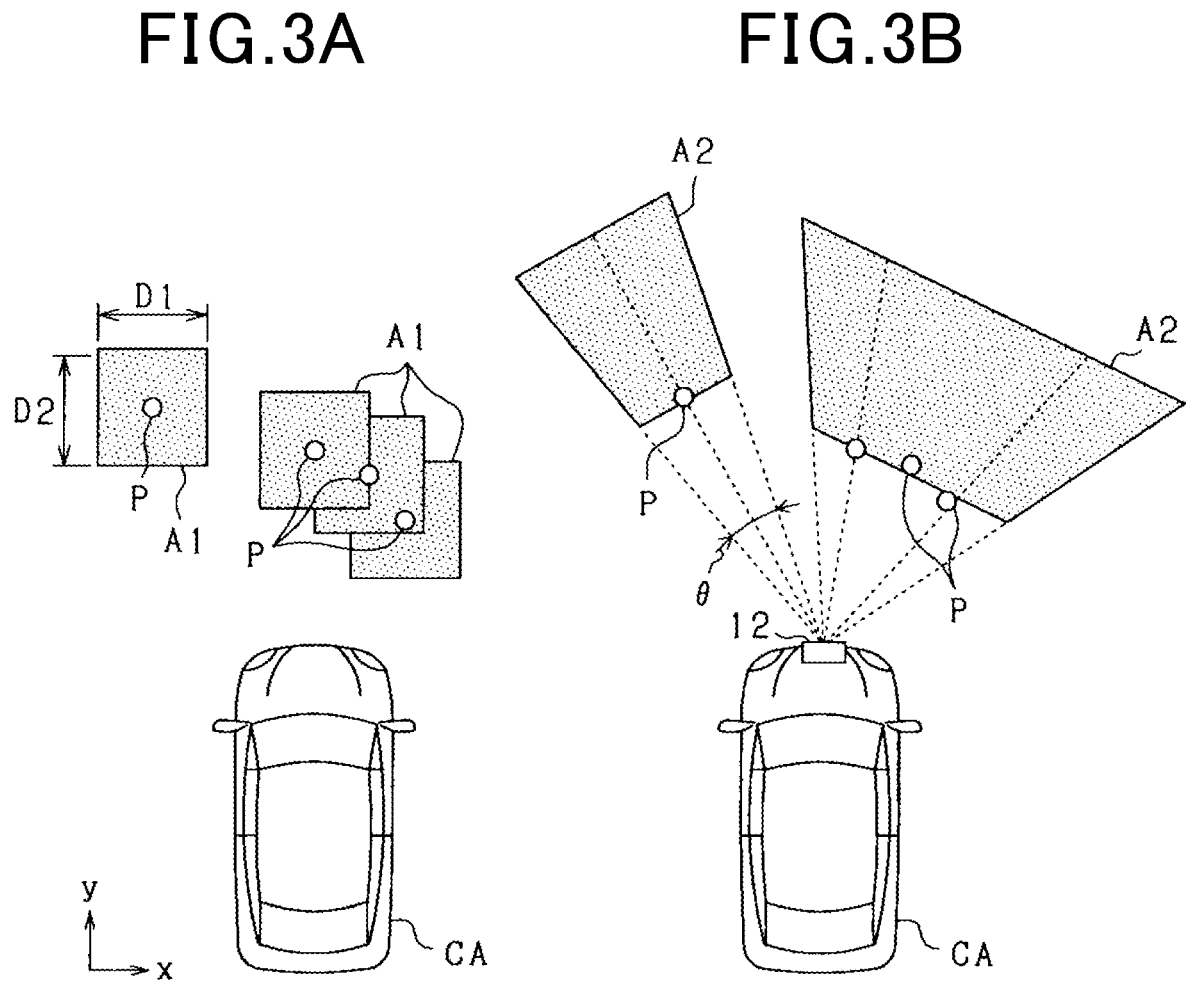

The neighborhood-of-stationary-object regions A1 and the far-side regions A2 may be set as follows, respectively. As illustrated in FIG. 3A, each neighborhood-of-stationary-object region A1 is set as a rectangular region with a predefined length in the lateral direction (x direction) and a predefined length in the longitudinal direction (y direction) of the own vehicle CA, centered on a detection point P on the stationary object by the sonar devices 12. For example, a length D1 in the x-direction and a length D2 in the y-direction of each neighborhood-of-stationary-object region A1 are both equal to 0.5 m. Instead of D1=D2, the length D1 may be greater than the length D2 (D1>D2), or the length D1 may be less than the length D2 (D1<D2).

The detection point P may not be at the center of the neighborhood-of-stationary-object region A1. Alternatively, the detection point P may be biased toward the own vehicle in the neighborhood-of-stationary-object region A1. That is, the size of a portion of the neighborhood-of-stationary-object region A1 on the far side of the detection point P and the size of a remaining portion of the neighborhood-of-stationary-object region A1 on the near side of the detection point P as viewed from the own vehicle CA may be different. For example, the portion of the neighborhood-of-stationary-object region A1 on the far side of the detection point P may be broader than the remaining portion of the neighborhood-of-stationary-object region A1 on the near side of the detection point P. Given the stationary-object detection information indicating that there are a plurality of detection points P on an outer surface of the stationary object, a neighborhood-of-stationary-object region A1 is set for each of the plurality of detection points P. A merged region of all of the neighborhood-of-stationary-object regions A1 is set as a mask region. Alternatively, each neighborhood-of-stationary-object region A1 may be a circular region with a predefined radius centered at the detection point P.

As illustrated in FIG. 3B, each far-side region A2 is set as a region that spans a predefined angle θ (or a predefined width) to the left and right relative to a straight line connecting the sonar device 12 installed at the front end of the own vehicle and the detection point P, and that extends a predefined distance from the detection point P in a direction away from the own vehicle CA. Given the stationary-object detection information indicating that there are a plurality of detection points P, a far-side region A2 is set for each of the plurality of detection points P. A merged region of all of the far-side regions A2 is set as a mask region.

At step S15, both the merged region of neighborhood-of-stationary-object regions A1 and the merged region of far-side region neighborhood-of-stationary-object regions are set as mask regions. Alternatively, either the merged region of neighborhood-of-stationary-object regions A1 or the merged region of far-side regions A2 may be set as a mask region.

Then, at step S16, the vehicle ECU 22 determines whether an object subjected to detection with the uncertain information (hereinafter referred to as a subjected-to-detection object X) is in the mask region. If the subjected-to-detection object X is in the mask region and the answer at step S16 is therefore YES, then the vehicle ECU 22 proceeds to step S17. At step S17, the vehicle ECU 22 considers the subjected-to-detection object X to be a stationary object. At step S18, the vehicle ECU 22 performs the collision avoidance process (the second actuation process) directed to stationary objects, and terminates the collision avoidance process. In this case, the vehicle ECU 22 considers the position of the object X included in the moving-object detection information to be a stationary object position, and based on the stationary object position, the vehicle ECU 22 performs collision avoidance control to actuate the safety devices 30. At step S18, based on the determination that the subjected-to-detection object X is in the mask region, the vehicle ECU 22 restricts the first actuation process directed to moving objects from being performed. In the present embodiment, the process step S18 corresponds to the actuation restriction unit 204 in FIG. 1B.

If the subjected-to-detection object X is not in the mask region and the answer at step S16 is therefore NO, then the vehicle ECU 22 proceeds to step S21. At steps S21 and S22, the vehicle ECU 22 performs the collision avoidance process (the first actuation process) directed to moving objects. In this case, in the collision avoidance process (first actuation process) directed to moving objects, the actuation region where the safety devices 30 are to be actuated is set narrower than in the normal collision avoidance process. Then, at step S22, the vehicle ECU 22 performs the collision avoidance process (first actuation process) directed to moving objects, and terminates the collision avoidance process.

Figure 4:
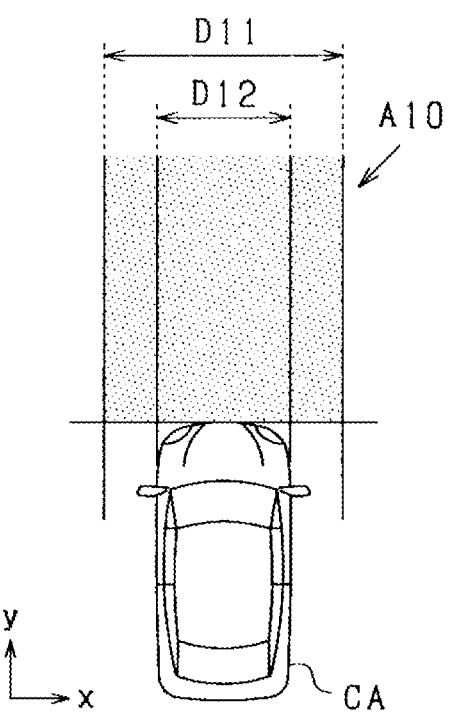
FIG. 4 is an illustration of an example of determination regions defined in a forward direction of travel of an own vehicle.

Changing the actuation region for the safety devices 30 will now be described with reference to FIG. 4. FIG. 4 illustrates the actuation region A10 defined in front of the own vehicle CA when the own vehicle CA is traveling forward. The actuation region A10 is a region for the safety devices 30 to be actuated to avoid a collision with a moving object when the first actuation process directed to moving objects is performed. The actuation region A10 is defined as a region having a predefined width in the lateral direction (x direction) in the forward direction of travel of the own vehicle CA.

More specifically, the actuation region A10 is defined as a region with a predefined margin on each of the left and right sides of the width of the own vehicle CA. The width of the actuation region A10 is D11. On the condition that a moving object is present in the actuation region A10, the vehicle ECU 22 performs the first actuation process on the moving object. For example, if the answer at step S13 is NO and thus the vehicle ECU 22 proceeds to step S22, that is, if the moving-object detection information is certain information, the vehicle ECU 22 performs the first actuation process based on the presence or absence of a moving object in the actuation region A10 having the width of D11.

However, at step S21, the moving-object detection information is uncertain information, and then the width of the actuation region A10 is changed from D11 to D12 (D12<D11). That is, when the moving-object detection information is uncertain information, the actuation region A10 is changed to a narrower region than when the moving-object detection information is certain information. Upon preceding from step S21 to step S22, the first actuation process is performed at step S22 based on the presence or absence of a moving object in the actuation region A10 having the width of D12.

If at step S14 it is determined that there is no stationary object around the own vehicle and the answer is therefore NO, then the vehicle ECU 22 proceeds to step S19. In this case, the vehicle ECU 22 recognizes that the moving-object detection information is uncertain information and that there is no stationary object among objects detected as uncertain information, and at steps S19 and S20, the vehicle ECU 22 re-determines whether the object is a moving object.

In detail, at step S19, the vehicle ECU 22 acquires a position history of the subjected-to-detection object X (the object subjected to detection with the uncertain information). At subsequent step S20, based on the position history of the object X, the vehicle ECU 22 determines whether the object X is actually a moving object. At step S19, for the subjected-to-detection object X, the vehicle ECU 22 acquires position information from measurements made by the sonar devices 12 every predefined time interval. In addition, at step S20, the vehicle ECU 22 uses a plurality of pieces of position information acquired during a predefined period of time from the current time to a previous time thereto, or a past several pieces of position information from the current time. Then, on the condition that the amount of movement of the subjected-to-detection object X is equal to or greater than a predefined value and the direction of position change in each cycle calculated from the position history is stable, the vehicle ECU 22 determines that the subjected-to-detection object X is a moving object.

Figure 5:
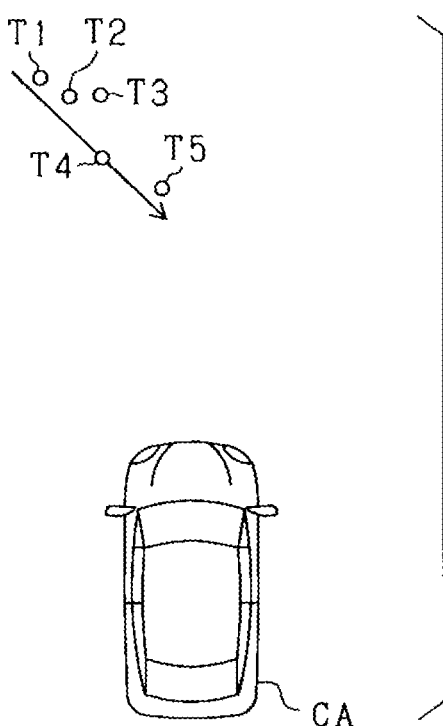
FIG. 5 is an illustration of time-series position data of a subjected-to-detection object.

More specifically, as illustrated in FIG. 5, the vehicle ECU 22 uses time-series position data T1 to T5 acquired at predefined time intervals for the subjected-to-detection object X to calculate an amount of movement of the object X in a predefined period (e.g., an amount of movement from times T5 to T1) and a direction of position change at each piece of position data, and based on the calculation result, make a re-determination as to whether the object X is a moving object.

If at step S20 it is determined that the object X is a moving object, the vehicle ECU 22 proceeds to step S21. Then, at steps S21 and S22, the vehicle ECU 22 performs the collision avoidance process (the first actuation process) directed to moving objects as described above. In this case, at step S21, the vehicle ECU 22 sets the actuation region where the safety devices 30 are to be actuated to a narrower region than normal, and then at step S22, performs the collision avoidance process (the first actuation process) directed to moving objects.

If at step S20 it is not determined that the object X is a moving object, the vehicle ECU 22 terminates the collision avoidance process. In this case, it remains uncertain whether the subjected-to-detection object X is actually a moving object. Thus, performance of the first actuation process directed to moving objects is withheld.

The present embodiment described in detail above can provide the following advantages:

(A1) In the present embodiment, at least either neighborhood-of-stationary-object regions A1 that are regions including a stationary object determined based on stationary-object detection information and its surroundings, or far-side regions A2 that are regions on the far side of the stationary object with respect to the own vehicle, are set as a mask region. In response to there being a moving object determined based on moving-object detection information in the mask region, performance of the first actuation process on the moving object is restricted. With this configuration, even if another stationary object present around the wall as a stationary object is mistakenly determined to be a moving object, the inconvenience of the safety devices 30 being unnecessarily actuated during the first actuation process due to a false determination that the other stationary object is a moving object can be suppressed. Even in cases where a moving object is present on the far side of the wall as a stationary object, the inconvenience of the safety devices 30 being unnecessarily actuated during the first actuation process can be suppressed. This can lead to a proper determination of a moving object and therefore allows the safety devices 30 to be correctly actuated based on this determination.

(A2) In the present embodiment, in response to a moving object detected based on images captured by the imaging devices being present in the mask region, the moving object is considered to be a stationary object and then the second actuation process directed to stationary objects, instead of the first actuation process directed to moving objects, is performed. This allows the safety devices 30 to be properly actuated for objects detected around the own vehicle.

(A3) In a configuration where moving objects are detected using images captured by the imaging devices, whether a moving object is present around the own vehicle may not be correctly determined despite the presence of the same object having been detected, except in cases where the same object around the own vehicle has already been known to be a moving object. Therefore, information that indicates the presence of a moving object may be configured to include any of certain information that it is certain that the object around the own vehicle is a moving object and uncertain information that it is not certain whether the object is a moving object.

The uncertain information as moving-object detection information is information that the presence of a moving object is not correctly detected only by captured images from the imaging devices. Even in such a detecting situation, according to the present embodiment, restricting performance of the first actuation process allows the presence or absence of a moving object to be correctly determined while taking into account stationary-object information.

(A4) For example, in cases where a stationary object is a wall, the stationary-object detection information may include a plurality of detection points on an outer surface of the stationary object. In the present embodiment, in such cases, a mask region is set separately for each detection point. That is, the mask region may be set according to the size of the stationary object. Therefore, it is possible to make a proper determination of a moving object while properly reflecting the relationship with the stationary object.

Other Embodiments

The above embodiments may be modified and implemented as follows:

(B1) Each camera 11 is not limited to a monocular camera. Alternatively, each camera 11 may be a stereo camera.

Figure 6:
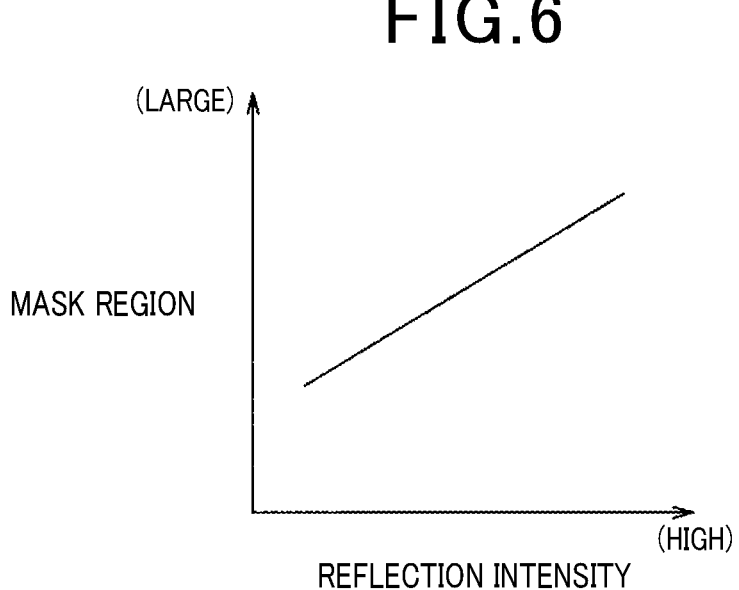
FIG. 6 is a graph illustrating a relationship between reflected wave intensity and size of a mask region for a sonar device.

(B2) The size of each mask region may variably be set. For example, in a configuration where devices that measure a distance to each object based on reflected waves from the object are used as the sonar devices 12, the reflection intensity of the reflected waves from the stationary object may be different depending on a form, such as the size or the like, of the stationary object. Therefore, the size of the mask region may be set based on the reflection intensity of the reflected waves. Specifically, at step S15 of FIG. 2, the neighborhood-of-stationary-object regions A1 and the far-side regions A2 may be set variably using the relationship illustrated in FIG. 6. In FIG. 6, the relationship between the reflection intensity of the reflected waves and the size of each mask region is defined such that the higher the reflection intensity of the reflected waves, the larger the mask region. In this configuration, using the relationship illustrated in FIG. 6, either the neighborhood-of-stationary-object regions A1 or the far-side regions A2 may variably be set.

Variably setting the size of the mask region based on the reflection intensity of the reflected waves allows an appropriate mask region to be set according to the form of the stationary object.

(B3) In the above embodiment, an example has been illustrated in which the vehicle ECU 22 corresponds to the control device, but the present disclosure is not limited thereto. Alternatively, the image processing ECU 21 and the vehicle ECU 22 may be combined to correspond to the control device. That is, the control device may generate moving-object detection information related to a moving object around the own vehicle based on the captured images from the imaging devices.

Although the present disclosure has been described in accordance with the above-described embodiments, it is not limited to such embodiments, but also encompasses various variations and variations within equal scope. In addition, various combinations and forms, as well as other combinations and forms, including only one element, more or less, thereof, are also within the scope and idea of the present disclosure.

What is claimed is:

1. A control device to be applied to a vehicle equipped with an imaging device configured to capture images of surroundings of the vehicle, a ranging device configured to measure a distance to an object around the vehicle, and a safety device configured to perform a first actuation process to avoid colliding of the vehicle with moving objects or reducing collision damage of the vehicle based on moving-object detection information acquired from the images captured by the imaging device or a second actuation process to avoid colliding of the vehicle with stationary objects or reducing collision damage of the vehicle based on stationary-object detection information acquired from measurements made by the ranging device, the control device comprising:

a non-transitory memory storing one or more computer programs;

a processor executing the one or more computer programs to:

based on the moving-object detection information, determine whether a moving object is present around the vehicle, wherein the moving-object detection information detected from the images includes certain information indicating that it is certain that the object around the vehicle is moving and uncertain information indicating that it is not certain whether the object around the vehicle is moving, the certain information and the uncertain information are determined based on a probability that the moving object is present, and the certain information comprises a higher probability that the moving object is present than the uncertain information;

based on the stationary-object detection information, determine whether a stationary object is present around the vehicle;

detect a plurality of detection points on an outer surface of the stationary object based on the stationary-object detection information acquired from measurements made by the ranging device;

set at least one of neighborhood-of-stationary-object regions that are regions including the stationary object determined to be present around the vehicle and its surroundings, far-side regions that are regions on a far side of the stationary object with respect to the vehicle, or a combination thereof, as a mask region, wherein an individual mask region is set for each of the plurality of detection points; and in response to the moving object being present in the mask region and on a condition that a presence of the moving object has been determined based on the uncertain information, actuate the safety device of the vehicle to perform the second actuation process to avoid colliding of the vehicle with the moving object or reducing collision damage of the vehicle, wherein in a case where the moving-object detection information detected from the images is the uncertain information but there are no stationary objects around the vehicle, determine whether the moving object is present around the vehicle based on a position history thereof acquired from the measurements made by the ranging device, in response to determining that the moving object is present around the vehicle based on the position history thereof, perform the first actuation process with an actuation region where the safety device is to be actuated set to a narrower region than an actuation region in which the moving-object detection information includes the certain information.

2. The control device according to claim 1, wherein in response to the moving object determined to be in the mask region, the moving object is considered to be a stationary object and then the second actuation process is performed and directed to the stationary object, instead of the first actuation process directed to the moving object.

3. The control device according to claim 1, wherein the ranging device is configured to transmit a probe wave and receive a reflected wave of the probe wave from the object, and measures the distance to the object based on the reflected wave, and a size of the mask region is set based on reflection intensity of the reflected wave.

4. A system for performing vehicle collision avoidance comprising:

an imaging device configured to capture images of surroundings of a vehicle;

a ranging device configured to measure a distance to an object around the vehicle;

a safety device configured to perform a first actuation process for avoiding a collision of the vehicle with moving objects or reducing collision damage based on moving-object detection information acquired from the images captured by the imaging device or a second actuation process to avoid a collision of the vehicle with stationary objects or reducing collision damage based on stationary-object detection information acquired from measurements made by the ranging device;

a non-transitory memory storing one or more computer programs;

a processor executing the one or more computer programs to:

based on the moving-object detection information, determine whether a moving object is present around the vehicle, wherein the moving-object detection information detected from the images includes certain information indicating that it is certain that the object around the vehicle is moving and uncertain information indicating that it is not certain whether the object around the vehicle is moving, the certain information and the uncertain information are determined based on a probability that the moving object is present, and the certain information comprises a higher probability that the moving object is present than the uncertain information;

based on the stationary-object detection information, determine whether a stationary object is present around the vehicle;

detect a plurality of detection points on an outer surface of the stationary object based on the stationary-object detection information acquired from measurements made by the ranging device;

set at least one of neighborhood-of-stationary-object regions that are regions including the stationary object determined to be present around the vehicle and its surroundings, far-side regions that are regions on a far side of the stationary object with respect to the vehicle, or a combination thereof, as a mask region, wherein an individual mask region is set for each of the plurality of detection points; and on a condition that a presence of the moving object has been determined based on the uncertain information, restrict performance of the first actuation process on the moving object in response to the moving object being present in the mask region, wherein in a case where the moving-object detection information detected from the images is the uncertain information but there are no stationary objects around the vehicle, determine whether the moving object is present around the vehicle based on a position history thereof acquired from the measurements made by the ranging device, in response to determining that the moving object is present around the vehicle based on the position history thereof, perform the first actuation process with an actuation region where the safety device is to be actuated set to a narrower region than an actuation region in which the moving-object detection information includes the certain information.

\* \* \* \* \*